United States Patent [19]

Nolf

[11] 4,241,409
[45] Dec. 23, 1980

[54] HAND HELD PEN-SIZE CALCULATOR

[76] Inventor: Jean-Marie Nolf, Chaussée de Namur, 6, Hamme-Mille, Belgium

[21] Appl. No.: 973,616

[22] Filed: Dec. 27, 1978

[30] Foreign Application Priority Data

Dec. 30, 1977 [BE] Belgium ................................ 184007

[51] Int. Cl.³ ............................................. G06F 3/033
[52] U.S. Cl. ............................. 364/705; 340/146.35 Y
[58] Field of Search ............................... 364/705, 709; 340/146.35 Y

[56] References Cited

U.S. PATENT DOCUMENTS

| 3,835,453 | 9/1974 | Narayanan | 340/146.35 Y |
| 3,937,939 | 2/1976 | Frenkel | 364/705 X |
| 4,007,364 | 2/1977 | Ojima et al. | 364/705 |
| 4,029,915 | 6/1977 | Ojima | 364/709 X |
| 4,070,649 | 1/1978 | Wright, Jr. et al. | 340/146.35 Y |
| 4,128,889 | 12/1978 | Ojima et al. | 364/705 |
| 4,139,837 | 2/1979 | Liljenwall et al. | 364/705 |

OTHER PUBLICATIONS

Crane et al., "An On-Line Data Entry System for Hand-Printed Characters", Computer, Mar. 1977, pp. 43-50.

Primary Examiner—David H. Malzahn
Attorney, Agent, or Firm—Spencer & Kaye

[57] ABSTRACT

A hand-held pen size calculator having a resiliently mounted writing head for entering data as they are being written on a writing surface and a character transducer arranged for detecting the axial motion of the writing head and the pivotal movement of the calculator in two opposite senses as the data is being written. The apparatus permits storage of characters as written by the user.

5 Claims, 9 Drawing Figures

HAND HELD PEN-SIZE CALCULATOR

BACKGROUND OF THE INVENTION

This invention relates to a hand held pen-size calculator having a writing head for entering data as they are being written on a writing surface.

In known pocket size calculators, data are entered by way of a keyboard. Such an arrangement, however, does not allow extreme miniaturization and cost reduction to be achieved for two reasons:

(1) keyboard design seems to have reached its minimum size and it will not be possible to go substantially further in miniaturization without impeding the easy actuation of the keys with the fingers of the hand;

(2) the relative mechanical complexity of the keyboard assembly.

Some attempts have been made to devise a writing instrument capable of generating a code signal indicative of a character as it is being written on a writing surface.

Besides several attempts that have devised a writing instrument requiring that the characters be written on a surface which has been subjected to a special treatment, there are others which permit a character recognition signal to be generated as the character is being written on any writing surface whatsoever. Such an apparatus is disclosed in U.S. Pat. No. 3,835,453. This apparatus comprises a contact arm having a portion which is mounted so that it is capable of pivotal movement in response to the rotation of a writing ball, the contact arm, as the writing ball is moved across the writing surface, being pivoted into contacting engagement with predetermined ones of a plurality of contact ends. This apparatus is constructed such that it generates character identification signals as the writing ball is moved in any direction across the writing surface provided the apparatus is held at an angular position with respect to the writing surface. This apparatus in itself is an improvement as compared to previous proposals in that it permits the calculating time to be reduced, for there is no need to actuate keys on a keyboard for entering the data and in that the apparatus is more convenient to use because the data are entered as they are simply being written on a writing surface. Furthermore, a written trace of the calculations still remains for later checking, which advantage is only provided with a more bulky and more expensive apparatus having a printing device. However, the contact arrangement in this apparatus appears to be rather unreliable when used at a small angular position with respect to the normal to the writing surface due to the lateral forces which occur and are applied to the contact arrangement as a character is being written. Further, this apparatus is not suitable for use in a hand held calculator for it is intended to operate in cooperation with a distant receiving apparatus including a code recognition network.

In all the attempts known so far a primary problem still remains unsolved. In effect, in these attempts it is necessary that the characters be written in a predetermined way. That is, these apparatus are not capable of recognizing any character as it is actually written by the user in its own very specific hand.

The invention solves this problem by providing an apparatus capable of storing the hand-writing of the user thereby guaranteeing the univocal recognition of the written characters as they are usually written by the user and to allow the user's hand writing to be stored.

SUMMARY OF THE INVENTION

An object of this invention is to provide a hand held pen-size calculator of very simple construction for permitting the data to be entered in a reliable way by simply writing the data on any writing surface.

Another object of the invention is to provide a pocket calculator apparatus comprising a writing head and a character transducer device capable of sensing the movement of the writing head across three distinct areas on the writing surface without regard to the inclination of the apparatus, when grasped in the hand, relative to the writing surface.

An additional object of this invention is to provide a pocket calculator apparatus having a writing head mounted on a resiliently mounted support with a barrel slidably mounted thereabout, the barrel being pivotably fixed for pivotal movement about a transverse axis, thereby permitting the sensing of an axial displacement of the support relative to the body of the apparatus and the sense in two opposite directions of the pivotal movement of the apparatus as it is being held in the user's hand.

The pocket calculator in accordance with the invention also comprises logic means for determining the sequence of simultaneous binary states of recognition signals enabling the univocal recognition of the characters as they are being written.

A further object of the invention is to provide a new line of low cost pocket calculators which can be "personalized"; that is, calculators which can be readily adapted by the user to his own hand by allowing his own writing of the characters to be stored, thereby avoiding the requirement of writing the characters in a prescribed conventional manner.

These and other objects of the invention together with the advantages thereof will be apparent in the more detailed description to follow.

DESCRIPTION OF AN EXEMPLARY EMBODIMENT

Figure 1:
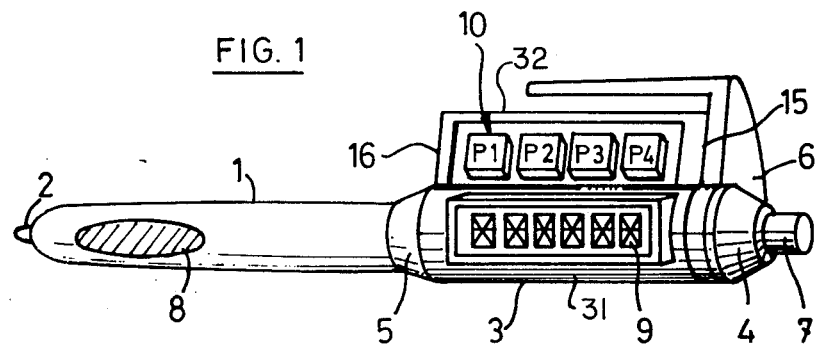
FIG. 1 is a general view of a calculator apparatus in accordance with the invention.
Figure 9:
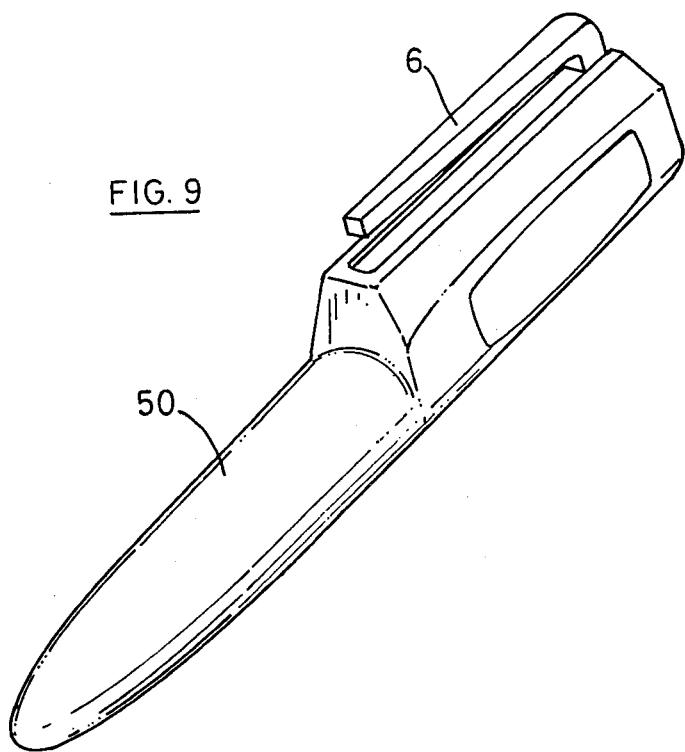
FIG. 9 shows the apparatus housed in a protecting housing.

Referring to FIG. 1 there is shown a pen-size calculator in accordance with the invention generally comprising an elongated hollow body 1 fitted with a writing head 2 at one end and a calculating unit 3 at the opposite end thereof. The calculating unit 3 is positioned by means of a ring 5 integral with the body 1 and secured thereto by way of a fastening ring 4. A clip 6 is advantageously secured between the calculating unit 3 and the fastening ring 4. The body 1 is formed with a grasping area 8 which permits grasping the calculator by the hand as will be apparent in the description to follow. The calculating unit 3 includes all the usual components of a calculator except the conventional data keyboard, namely: a data store, a program store, a data processor, a display device and a voltage supply device. In the illustrated embodiment, the unit 3 is comprised of a cylindrical portion 31 secured to and in axial alignment with the body 1, and a projecting portion 32 with a trapezoidal cross-section. The cylindrical portion 31 has the display area 9 and the projecting portion 32 has program keys 10. The push-button 7 serves to switch the voltage supply for the calculating unit 3. As shown in FIG. 9, a housing 50 made of flexible plastic or similileather or the like, is provided to protect the writing head as well as the program keys 10 and the display area 9 when the calculator is not in use.

Figure 2:
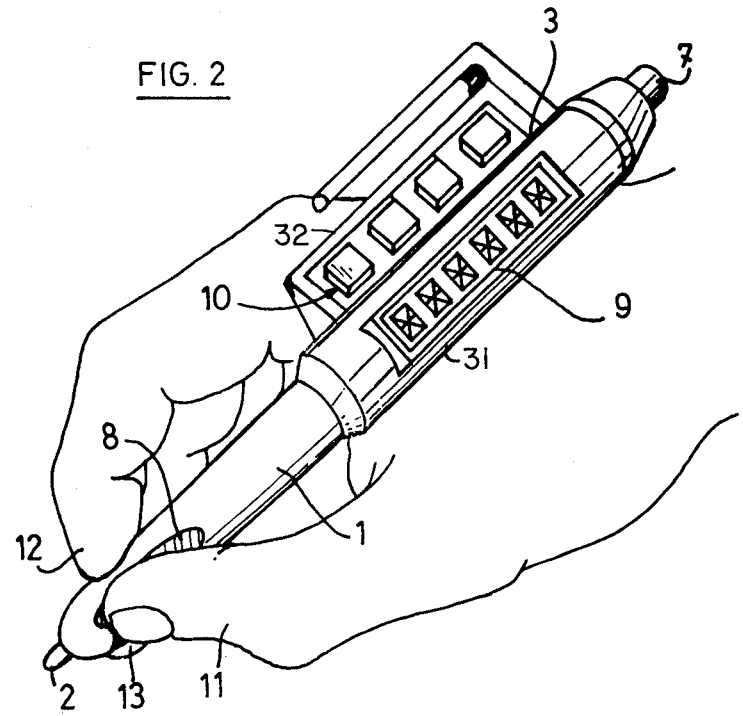
FIG. 2 is a diagrammatic view of the apparatus of FIG. 1 as it is being held in the right hand of a user.

The assembly is designed for holding in the right as well as in the left hand. When held in the right hand, the assembly is grasped as shown in FIG. 2: the thumb 11 is placed against the grasping area 8, the index finger 12 and the second finger 13 are placed in the same usual way as for holding a pencil. The back face of the unit 3 is set to rest on the left side of the index finger thereby allowing easy writing and observation of the display area 9. To enable the apparatus to be used when being held in the left hand, the assembly is disassembled by removing the fastening ring 4 and the unit 3 is then repositioned with its side face 15 placed against the positioning ring 5; thereafter, the clip 6 and the fastening ring 4 are secured again against the side face 16 of unit 3. In order to ensure that the grasping area 8 is correctly positioned in relation to the display area 9 for the calculator to be used conveniently when beng held in the right or the left hand, the unit 3 is formed with a different positioning lug on each of its side faces 15 and 16.

Figure 3:
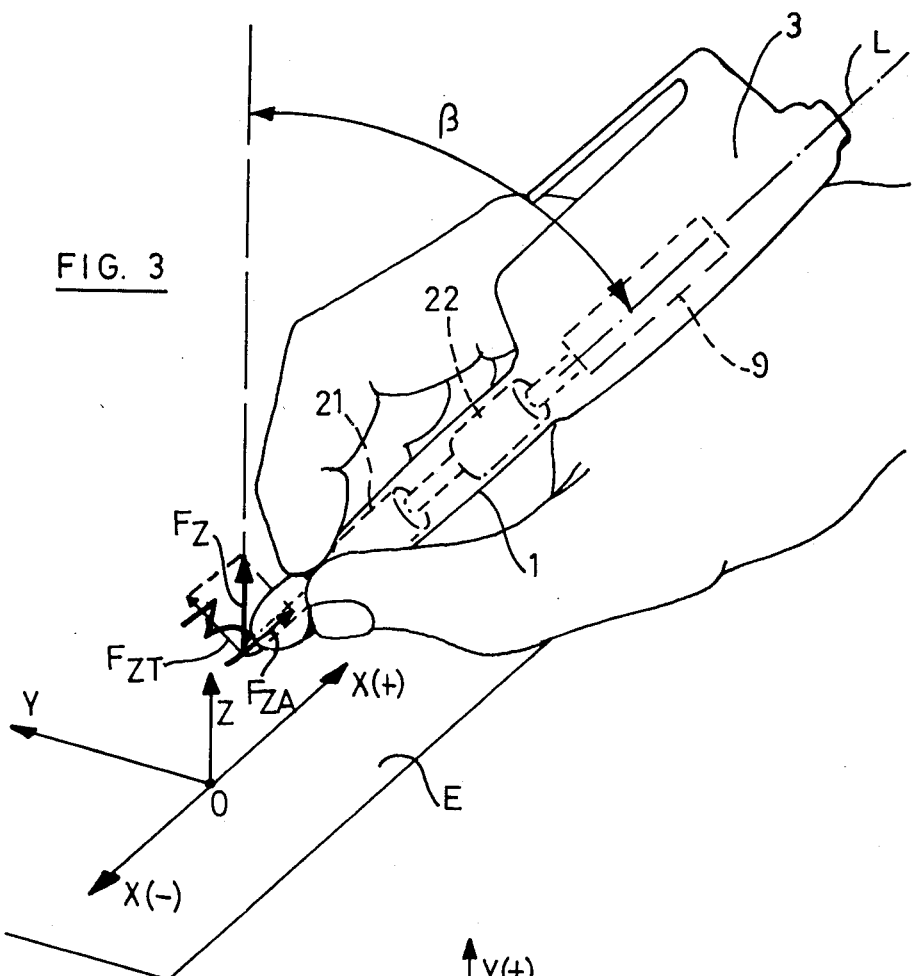
FIG. 3 is a diagrammatic view of the apparatus as it is being held in the hand as depicted in FIG. 2, showing the sensing axes for character recognition.

Inside the body 1 there is housed the character transducer device operative for entering the data in the calculating unit 3 as they are being written on a writing surface by means of the writing head 2. An object of the device of this invention is to identify a character as it is being written by sensing the motions of the writing head across the writing surface. In order to have a clear understanding of the device in accordance with the invention, reference will be made to FIGS. 3 and 4. The diagrammatic picture of FIG. 3 shows the calculator as it is being held in the right hand with the writing head 2 applied onto the writing surface E. The tracing of a character can be subdivided in two parameters:

(a) an application of the writing head 2 to the writing surface E (once or several times as the character is drawn) and production of a pressure resulting in the occurrence of a force $F_Z$ substantially perpendicular to the plane of the writing surface E, and particularly an axial component $F_{ZA}$ of the force $F_Z$ along the longitudinal axis L of the apparatus;

(b) a motion of the writing head 2 across the writing surface during the application of the force $F_Z$.

Figure 4:
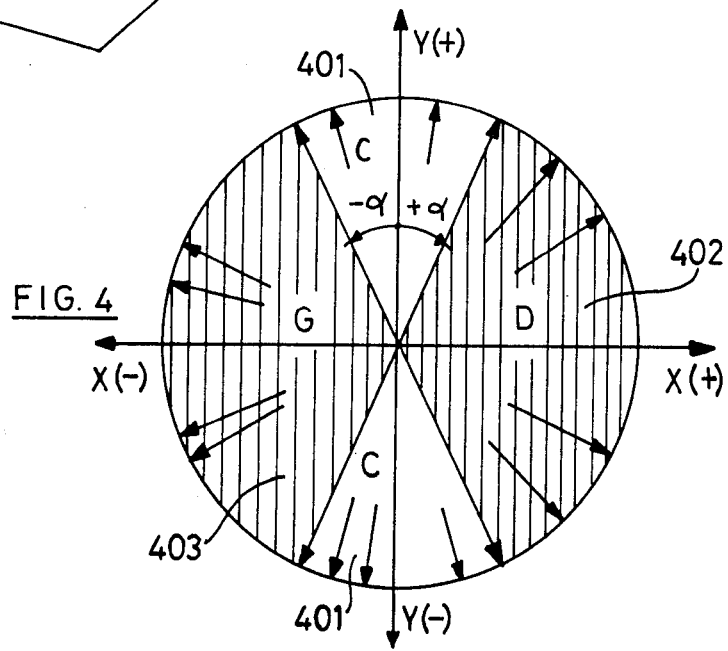
FIG. 4 is diagrammatic view of the writing surface showing the sensing areas across the surface.

Looking now at FIG. 4 which represents the plane of the writing surface E referred to the XY coordinates, the motion of the writing head across the plane of the surface E starting from the center position O can be made along radial directions comprised in three distinct areas:

(a) a first area 401 extending on both sides of directions $OY(+)$ and $OY(-)$ over an angle $\pm\alpha$:
a motion across this first area will be denoted "C" (Center) hereafter;

(b) a second area 402 extending on both sides of direction $OX(+)$ over an angle $(\pi/2-\alpha)$:
a motion across this second area will be denoted "D" (Right) hereafter;

(c) a third area 403 extending on both sides of direction $OX(-)$ over an angle $(\pi/2-\alpha)$:
a motion across this third area will be denoted "G" (Left) hereafter.

In the present invention the transducer device for identifying the characters as they are being written is operative to sense the occurrence of the application force $F_Z$, in fact the axial component $F_{ZA}$ thereof, and the sequence of said component $F_{ZA}$ and of the relative motions D, G, C without regard to the inclination angle $\beta$ between the longitudinal axis L of the apparatus and the axis Z perpendicular to the writing surface E.

Figure 5:
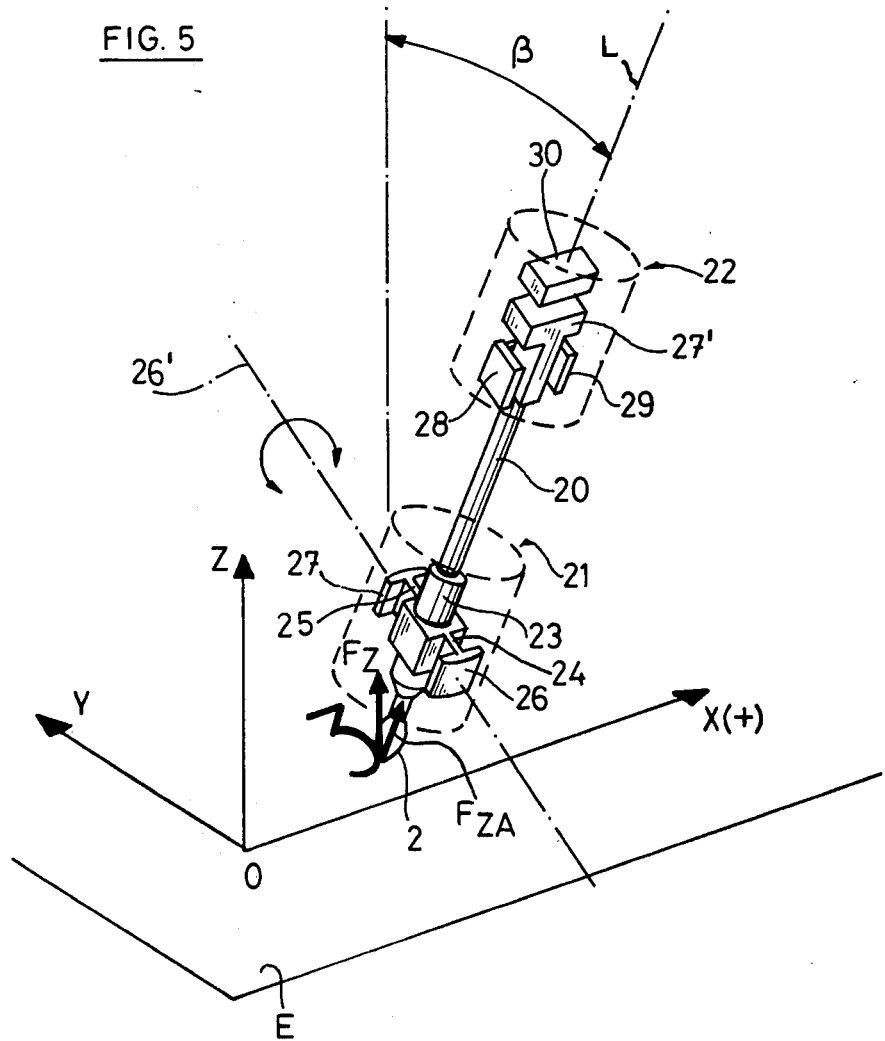
FIG. 5 is a schematic view of the character transducer device.

With the above in mind, the character transducer device of the invention will now be described with reference to FIG. 5. The writing head 2 is fixed at one end of the elongated support 20 which extends lengthwise and is resiliently mounted in the body 1. About the support 20, adjacent the head 2, there is slidably mounted an elongated barrel 23. The latter has thin flexible blades 24, 25 fixed thereto, which extend transversally with respect to the longitudinal axis L of the support 20. The blades 24, 25 are fixed at their other ends to pads 26, 27 which are fixed on the body 1. The flexibility of the blades allows a pivotal movement about a pivot axis 26' transverse to the longitudinal axis L.

At its end, opposite to the writing head, the support 20 has an element 27' mounted for cooperation with three detecting means 28, 29, 30 mounted on the body 1 and having the purpose of detecting the axial and pivotal movements of the support 20. The detecting means 30 is mounted in axial alignment with the support 20 and the element 27' so as to be in contacting cooperation with the latter when the support 20 has moved axially with respect to the body 1, thereby indicating that the writing head is pressed onto a writing surface. The detecting means 28 and 29 are mounted on a transverse axis perpendicular to the longitudinal axis L of the support 20 and to the pivot axis 26'. Each of these two detecting means 28, 29 is placed so as to be in contacting cooperation with the element 27' on the support 20 when the latter is pivoted about the pivot axis 26' in response to the writing head 2 being moved across area "D" or area "G" respectively. The detecting means 28, 29, 30 can be comprised of devices of any known type (e.g. resistive, magnetoresistive, inductive, capacitive, Hall effect, optical, piezo electrical) capable of sensing displacements and of generating electric signals representing such displacements. The spaces between the element 27' and the detecting means 28, 29, 30 are advantageously filled with an elastomeric material to assure: (a) the same neutral position for the element 27' in the absence of any pressure on the support 20; (b) a limited displacement of the element 27' so as to make the displacement of the writing head 2 relative to the writing surface little or not perceptible; (c) a progressive displacement of the element 27' as a function of the forces applied to the writing head 2, thereby to controlling the value of the angle α and the decision level for the presence or absence of the axial force $F_{ZA}$.

Figure 6:
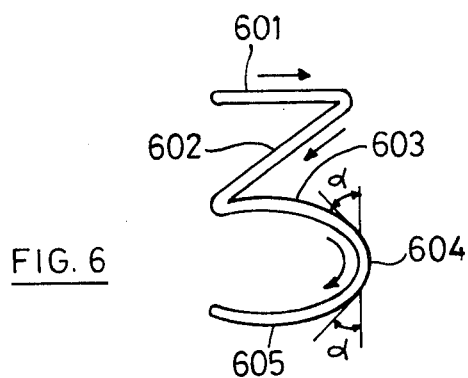
FIGS. 6 and 7 are diagrams illustrating the sensing procedure of an exemplary character as it is being written.

When activated in response to being in contacting cooperation with the element 27', the detecting means 28,29,30 generate signals $V_D$, $V_G$ and $V_{ZA}$ representing the motions D, G and $F_{ZA}$. As an exemplary illustration, let us consider the writing down of the digit three. Looking at FIG. 6, it is apparent that the character three is drawn in one motion following the arrows. Assuming, as is conventional in information theory, that the presence of a signal is represented by a binary 1 state and the absence of signal by a binary 0 state, the digit three comprises the following portions:

(a) portion 601 requiring that the writing head be moved to the right, resulting in signal D being binary 1 (signals G and C are binary 0);

(b) portion 602 requiring that the writing head be moved downwards to the left, resulting in signal G being binary 1 (signals D and C are binary 0);

(c) portion 603 requiring that the writing head be moved to the right, resulting in the signal D being binary 1 (signal G and C are binary 0);

(d) portion 604 requiring that the writing head be moved downwards across the center area within an angle ±α, resulting in the signals D and G being 0 (or signal C being binary 1);

(e) portion 605 requiring that the writing head be moved to the left, resulting in the signal G being binary 1 (signals D and C are binary 0).

Throughout the writing of portions 601-605, the writing head is kept pressed on the writing surface and consequently the signal $F_{ZA}$ is binary 1 throughout.

Figure 7:
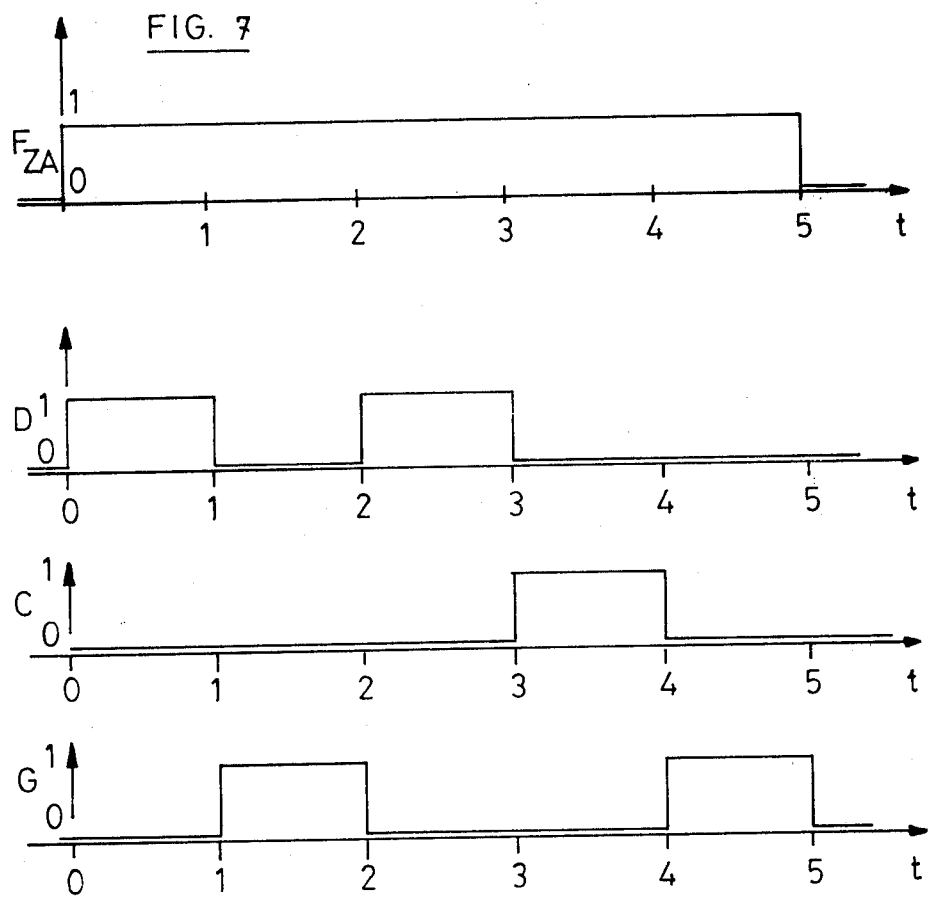

The signals resulting from the drawing of the digit three are illustrated in the diagrams of FIG. 7. The abscissae indicate the portions of the character and the ordinates represent the binary states of the signals $F_{ZA}$, D, G and C.

Figure 8:
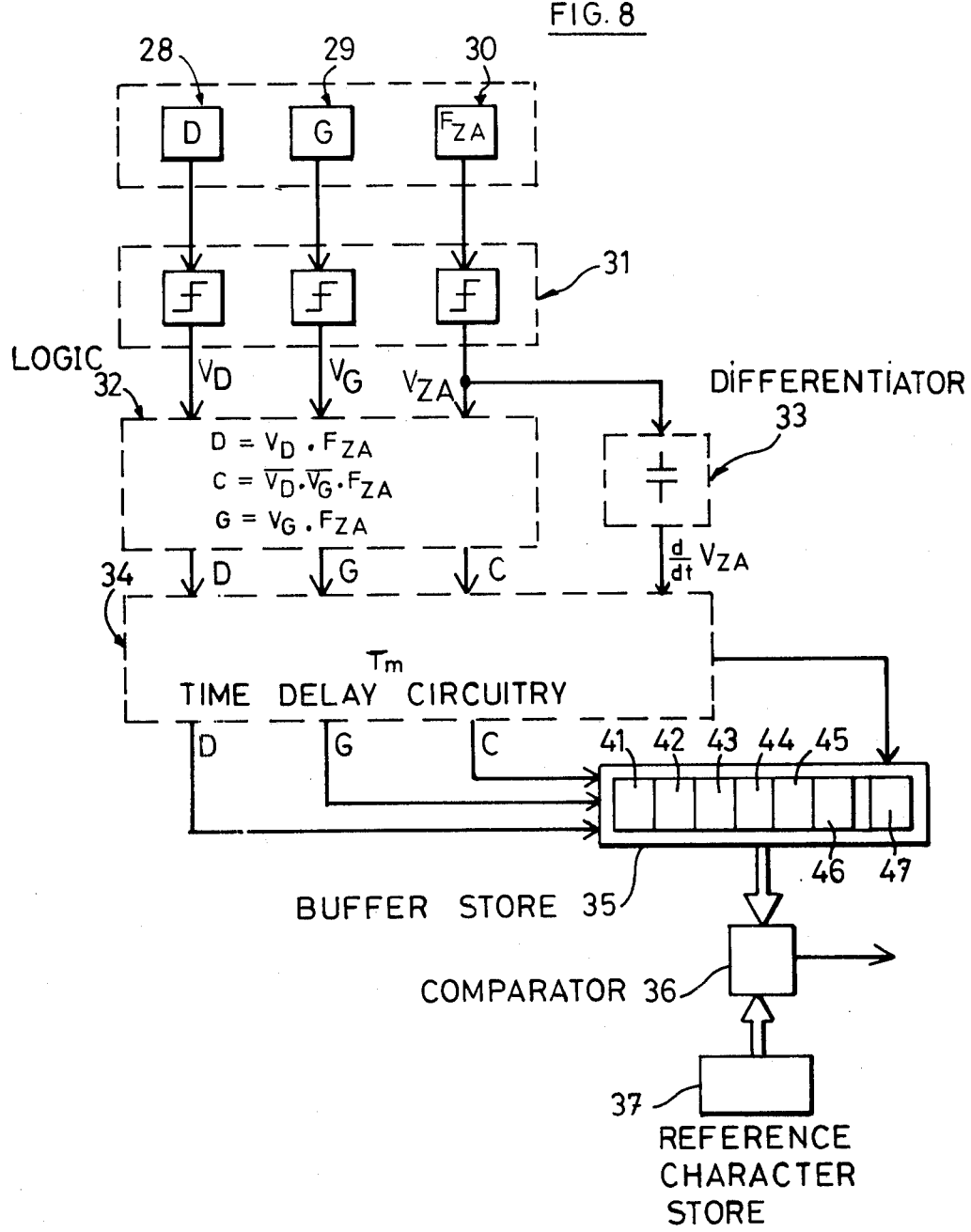
FIG. 8 is a schematic diagram of the logic circuitry included in the character transducer of the invention.

The outputs from the detecting means 28, 29, 30 are fed into an electronic analyser having the function of processing the signals in order to recognize the character drawn with the writing head. An exemplary embodiment is schematically depicted in FIG. 8. The signals $V_D$, $V_G$ and $V_{ZA}$ from the detecting means 28, 29 and 30, respectively, are fed through signal shaper means 31 (known per se) into a logic circuitry 32 comprising an arrangement of AND-gates operative for checking the simultaneous signal states and producing recognition signals D, C, G for character identification.

Considering again the drawing of the digit three (see FIGS. 6 and 7), the logic 32 checks for the following conditions:

(a) D=1 when signals $V_D$ and $V_{ZA}$ are concurrently binary 1, which is represented by the Boolean relation:

$$D = V_D \cdot V_{ZA}$$

(b) G=1 when the signals $V_G$ and $V_{ZA}$ are concurrently binary 1, that is:

$$G = V_G \cdot V_{ZA}$$

(c) C=1 when the signals $V_D$ and $V_G$ are binary 0 with signal $V_{ZA}$ being concurrently binary 1, which is represented by the Boolean relation:

$$C = \overline{V_D} \cdot \overline{V_G} \cdot V_{ZA}$$

In the disclosed example of the drawing of the digit three, the logic 32 will produce the following state sequence for the recognition signals D, G and C:

| D | 1 | 0 | 1 | 0 | 0 |
|---|---|---|---|---|---|
| G | 0 | 1 | 0 | 0 | 1 |
| C | 0 | 0 | 0 | 1 | 0 |

Concurrently with the procedure of processing the signals $V_D$, $V_G$ and $V_{ZA}$, the signal $V_{ZA}$ is applied to differentiating means 33 (known per se) for determining the number of times the force $F_{ZA}$ occurs.

The outputs from the logic 32 and the differentiating means 33 are then fed into a time delay arrangement 34 (known per se) arranged to delay the input signals by some determined time Tm in order to assure that the signals have a minimum duration Tm, for instance 30 milliseconds. A typical example of the time delay arrangement is a sampler device connected to be operative for sampling the signals at a frequency of 100 Hz with the aid of the timing pulses which are used in the calculating unit and for enabling their reading into a buffer store 35 after a number of samples (e.g. four) have occurred. In this case, the character registering and recovering time would be 800 milliseconds approximately. The writing time would be 400 to 800 milliseconds approximately. The enabled signals read into the buffer store 35 form a word therein which describes the character drawn with the writing head. The format of this word will be described in greater detail below.

Also provided is a reference character store 37 which can be a read-only memory (ROM), known per se, wherein the codes of all the characters to be recognized are stored. The comparator 36 is arranged in a manner known in the art to be operative e.g. for sequentially comparing the content of the buffer store 35 with each of the reference codes contained in the reference store 37. When the content of buffer store 35 is identical to a reference code from store 37, the comparator 36 produces an identification signal for enabling the content of buffer store 35 to be read into the data store (not shown) of the calculating unit 3.

Consideration will now be given to the format of the character word read into the store 35. This word has a plurality of fields each capable of storing the state of a respective one of the signals D, G and C, and one field capable of storing the code representing the number of occurrences of the signal $V_{ZA}$. The format to be chosen will depend on the number of bits to be allotted to the signals D, G, C and this number of data must be able to describe without ambiguity all the desired characters. In this respect it is known that the number of characters which have to be sensed and recognized usually varies from about seventeen for simple calculators intended for performing the four basic operations up to about forty for more sophisticated calculators intended to solve scientific problems. It therefore appears to be sufficient if a format comprising seven fields is chosen, that is six fields assigned to the signals D, G, C and one field assigned to the number of occurrences of the signal $V_{ZA}$. Such a seven-field format is assumed to be provided in the disclosed embodiment as illustrated in FIG. 8 in which the buffer store 35 comprises the six fields 41 to 46 for the signals D, G, C and the seventh field 47 for the number of occurrences of signal $V_{ZA}$. The seven-field format can contain fifteen bits: two bits allotted to each of the fields 41 to 46 and three bits allotted to the field 47. Such a fifteen-bit format is capable of recognizing $2^{15}-1=32767$ different combinations, which compares favourably with the usual number of characters to be recognized.

Table I lists exemplary seven-field codes for eighteen usual characters required for a simple calculator, namely: the digits 0 to 9, the operation symbols (+, −, ×, ÷), the equality symbol (=), the point (.), the symbols for cancelling the last entry (//) and the complete data store (///). Considering for instance the particular digit three example, the character word format in store 35 would be:

| 10 | 01 | 10 | 11 | 01 | 00 | 001 |
|----|----|----|----|----|----|-----|
| D  | G  | D  | C  | G  | 0  | 1   |

With such a format, the total capacity of the buffer store 35 is about 255 bits for seventeen characters and about 600 bits for forty characters, these capacities being quite compatible with the present read-only memory techniques.

From the foregoing it is apparent that the parameters to be taken into account for being processed in order to recognize and define univocally the characters drawn with the writing head are the following;

(a) the three decision levels for the signals $V_D$, $V_G$, $V_{ZA}$ and the value for the angle $\alpha$;

(b) the time delay Tm, that is the sampling frequency and the number of pulses for a data to be acceptable;

(c) the number of binary data able to describe all the desired characters;

(d) the maximum number of distinct applications of an axial force $F_{ZA}$ as a character is being drawn.

An important and advantageous feature of the apparatus in accordance with this invention is its capability of allowing some of the unemployed combinations to be used for storing particular tracings for some characters. For instance, the apparatus permits storage of the digit seven drawn as 7̶ and 7. Also the unemployed combinations allow the user, under a training period, to adapt the apparatus to his or her own hand. For that purpose, the user writes down the characters one by one according to a sequence proposed by the display. Thereafter, following a program procedure to be stored in the program store included in the calculating unit 3, the character code words are read from the buffer store 35 into the reference character store 37. Of course, the stored code words can be cancelled when desired, for instance when the apparatus is to be used by another user.

The apparatus in accordance with the invention is also suitable for entering the necessary characters for performing scientific calculations. The characters which are usually provided for that purpose include the constants $\pi$ and e, the various conventional functions: trigonometric, exponential, logarithmic, reading into store (STO), recovering (RCL), inversion and angle/radian conversion.

The constants are entered by simply writing down the respective characters. The inversion and angle/radian conversion are entered with the aid of program keys. The other functions can be entered by adopting a simple writing rule which is in no way different from the usual rule to be observed for entering data by way of a key board. In order to enter a function it suffices to successively write down the argument, then a pair of square brackets which may be put so as to bracket the argument, and then the symbol for the desired function.

Table II shows for the usual functions listed in the left column, the character writing sequence (right column) and the traces (central column) which remain written on the paper after completion of the writing operation.

TABLE I

| CHARACTERS | FIELDS | | | | | | |
|---|---|---|---|---|---|---|---|
| | 41 | 42 | 43 | 44 | 45 | 46 | 47 |
| ϕ | G | C | D | C | G | G | 2 |
| 1 | C | 0 | 0 | 0 | 0 | 0 | 1 |
| 2 | C | D | C | G | D | 0 | 1 |
| 3 | D | G | D | C | G | 0 | 1 |
| 4 | G | D | C | 0 | 0 | 0 | 1 |
| 5 | C | D | C | G | D | 0 | 2 |
| 6 | D | C | G | C | D | 0 | 1 |
| 7 | D | G | 0 | 0 | 0 | 0 | 1 |
| 8 | D | C | G | C | D | C | 1 |
| 9 | G | C | D | C | G | 0 | 1 |
| x | G | D | 0 | 0 | 0 | 0 | 2 |
| + | C | D | 0 | 0 | 0 | 0 | 2 |
| ÷ | D | 0 | 0 | 0 | 0 | 0 | 1 |
| − | D | 0 | 0 | 0 | 0 | 0 | 1 |
| = | D | D | 0 | 0 | 0 | 0 | 2 |
| . | G | D | C | 0 | 0 | 0 | 3 |
| // | G | G | 0 | 0 | 0 | 0 | 2 |
| /// | G | G | G | 0 | 0 | 0 | 3 |

TABLE II

| Functions | What remains written | Writing sequence |
|---|---|---|
| sin x | sin [x] | x[ ] sin |
| cos x | cos[x] | x[ ]cos |
| tan x | tan[x] | x[ ]tan |
| 1/x | $\frac{1}{[x]}$ | x[ ]$\frac{1}{}$ |
| $\sqrt{x}$ | $\sqrt{[x]}$ | x[ ]$\sqrt{}$ |
| $x^2$ | $[x]^2$ | x[ ]2 |
| LN x | LN[x] | x[ ]LN |
| LOG x | LOG[x] | x[ ]LOG |
| $e^x$ | [e]EXP[x] | e[ ]EXP[ ]x |
| $10^x$ | [10]EXP[x] | 10[ ]EXP[ ]x |
| $y^x$ | [y]EXP[x] | y[ ]EXP[ ]x |
| STO x | STO[x] | x[ ]STO |
| RCL y | [ ]RCL | [ ]RCL |

What is claimed is:

1. A hand held calculator comprising:
an elongated hollow body;
an elongated support extending lengthwise and resiliently mounted in the body, said support having a writing head mounted at one end thereof and an indicating means at its other end;
an elongated barrel slidably mounted about said support, said barrel being pivotably fixed to said body at two opposite points for defining a pivot axis such that the barrel is capable of pivotal movement about said pivot axis;
a character transducer located in the body for detecting the sense of movement of the writing head across the writing surface as a character is being written on said writing surface and for generating a sequence of signals representing said character, said transducer comprising first detecting means mounted on the body in axial alignment with the support so as to cooperate with said indicating means on the support for generating a first signal in response to the support being moved axially with respect to the body, second and third detecting means mounted on the body along a transverse axis perpendicular to said pivot axis for detecting the pivotal movement of said barrel about the pivot axis, said second detecting means being operative to generate a second signal indicating the pivotal movement in a first sense, and said third detecting means being operative to generate a third signal indicating the pivotal movement in the opposite sense;

logic means responsive to said first, second and third signals to generate a fourth signal representing the combination of distinct states of said first, second and third signals, buffer store means for temporarily storing said fourth signal, reference store means for storing signals each representing a distinct written character, comparator means connected to accept the content of said buffer means, compare it to each signal from the reference store means and generate a distinct identification signal when the signal from the buffer means is identical to a signal from the reference store means; and a calculating unit mounted on the body, said calculating unit having a display area.

2. A calculator according to claim 1, which further comprises time delay means connected between said logic means and said buffer store means, said time delay means being operative to enable said fourth signal to be read into said buffer store means when said fourth signal has a predetermined duration.

3. A calculator according to claim 1, wherein the spaces between said indicating means on the elongated support and said first, second and third detecting means are filled with an elastomeric material.

4. A calculator according to claim 1, wherein the body has on its outer surface, adjacent the writing head, a grasping area for assuring the body being grasped properly by the user's hand.

5. A calculator according to claim 4, wherein the calculating unit has two side faces extending transversally with respect to the longitudinal direction of said body, said side faces having a pair of distinct positioning lugs for assuring the proper positioning of said grasping area in relation to said display area.

* * * * *